(12) United States Patent
Yoshizaki et al.

(10) Patent No.: US 10,857,941 B2
(45) Date of Patent: Dec. 8, 2020

(54) E-MIRROR AUTOMATIC POSITION ADJUSTMENT SYSTEM

(71) Applicant: Toyota Motor Engineering & Manufacturing North America, Inc., Plano, TX (US)

(72) Inventors: Coh L. Yoshizaki, Wixom, MI (US); Varun J. Prabhakar, Saline, MI (US); David B. Auner, South Lyon, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/259,940

(22) Filed: Jan. 28, 2019

(65) Prior Publication Data
US 2020/0238906 A1 Jul. 30, 2020

(51) Int. Cl.
*B60R 11/04* (2006.01)
*B60R 1/00* (2006.01)
(Continued)

(52) U.S. Cl.
CPC .............. *B60R 1/00* (2013.01); *B60R 1/04* (2013.01); *B60R 1/12* (2013.01); *B60R 11/04* (2013.01); *G03B 17/561* (2013.01); *G06T 3/00* (2013.01); *G06T 7/0002* (2013.01); *H04N 5/23299* (2018.08); *H04N 5/247* (2013.01); *B60R 2001/1215* (2013.01); *B60R 2011/004* (2013.01); *B60R 2011/0049* (2013.01); *B60R 2011/0084* (2013.01);
(Continued)

(58) Field of Classification Search
CPC .... B60R 1/00; B60R 1/04; B60R 1/12; B60R 2011/004; B60R 11/04; B60R 2300/60; B60R 2300/602; B60R 2300/607; H04N 5/247; H04N 5/23299; G06T 3/00; G06T 7/0002; G03B 17/561
USPC .......................... 348/148; 382/103; 359/841
See application file for complete search history.

(56) References Cited

U.S. PATENT DOCUMENTS 4,498,744 A     2/1985    Ealovega et al.
6,151,175 A * 11/2000    Osha ....................... B60R 1/025
                                                                           33/264
(Continued)

FOREIGN PATENT DOCUMENTS

EP            3281825         2/2018

*Primary Examiner* — Nasser M Goodarzi
*Assistant Examiner* — Patrick A Ryan
(74) *Attorney, Agent, or Firm* — Snell & Wilmer LLP

(57) ABSTRACT

Methods, systems, and apparatus for providing a view of an environment behind a vehicle. The system includes a camera located on a track and connected to the vehicle, the camera configured to detect image data of the environment behind the vehicle. The system also includes an actuator configured to move a position of the camera along the track. The system includes an electronic control unit (ECU) configured to determine, based on the image data, whether the view of the environment behind the vehicle is obscured. The ECU is configured to adjust, using the actuator, the position of the camera along the track when the view of the environment behind the vehicle is obscured until the view of the environment behind the vehicle is unobscured or less obscured. The system includes a rear-view mirror connected to the ECU and configured to display the view of the environment behind the vehicle.

19 Claims, 16 Drawing Sheets

(51) Int. Cl.
*B60R 1/12* (2006.01)
*B60R 1/04* (2006.01)
*H04N 5/232* (2006.01)
*G06T 7/00* (2017.01)
*H04N 5/247* (2006.01)
*G06T 3/00* (2006.01)
*G03B 17/56* (2006.01)
*B60R 11/00* (2006.01)
*G06K 9/00* (2006.01)

(52) U.S. Cl.
CPC ..... *B60R 2300/105* (2013.01); *B60R 2300/20* (2013.01); *B60R 2300/304* (2013.01); *B60R 2300/602* (2013.01); *B60R 2300/8006* (2013.01); *B60R 2300/8066* (2013.01); *G06K 9/00791* (2013.01); *G06K 9/00832* (2013.01); *G06T 2207/20081* (2013.01); *G06T 2207/20221* (2013.01)

(56) References Cited

U.S. PATENT DOCUMENTS

| | | | |
|---|---|---|---|
| 6,315,180 B1 * | 11/2001 | Watkins | B60R 11/04 224/275 |
| 6,318,062 B1 * | 11/2001 | Doherty | D07B 3/10 57/206 |
| 8,194,132 B2 * | 6/2012 | Dayan | B60K 35/00 348/148 |
| 8,199,975 B2 | 6/2012 | Pomerleau et al. | |
| 8,988,526 B2 | 3/2015 | Schütz | |
| 9,204,106 B2 * | 12/2015 | Mitsuta | B60R 1/00 |
| 9,205,784 B2 | 12/2015 | Clements et al. | |
| 9,403,484 B2 | 8/2016 | Brandt et al. | |
| 9,669,771 B1 | 6/2017 | Helm | |
| 9,843,777 B2 | 12/2017 | Schofield et al. | |
| 9,880,253 B2 * | 1/2018 | Tan | G01S 5/0284 |
| 9,971,943 B2 | 5/2018 | Greenwood et al. | |
| 10,053,015 B2 | 8/2018 | Peterson et al. | |
| 10,070,023 B2 | 9/2018 | Moenig et al. | |
| 10,091,453 B1 * | 10/2018 | Englander | H04N 7/18 |
| 2008/0304705 A1 * | 12/2008 | Pomerleau | B60R 1/00 382/103 |
| 2012/0229639 A1 | 9/2012 | Singleton | |
| 2013/0038731 A1 * | 2/2013 | Brey | B60R 11/04 348/148 |
| 2014/0376119 A1 * | 12/2014 | Sobecki | B60R 1/074 359/841 |
| 2017/0057423 A1 | 3/2017 | Wang | |
| 2018/0065558 A1 * | 3/2018 | Matsuyama | B60R 1/12 |
| 2018/0171594 A1 * | 6/2018 | Tsuji | H04N 5/23238 |
| 2018/0220081 A1 * | 8/2018 | Lewis | B60R 1/00 |
| 2018/0222319 A1 * | 8/2018 | Fujisaki | B60R 1/00 |
| 2018/0222320 A1 * | 8/2018 | Kochiya | G06T 11/00 |
| 2018/0251122 A1 * | 9/2018 | Golston | B60W 40/08 |

* cited by examiner

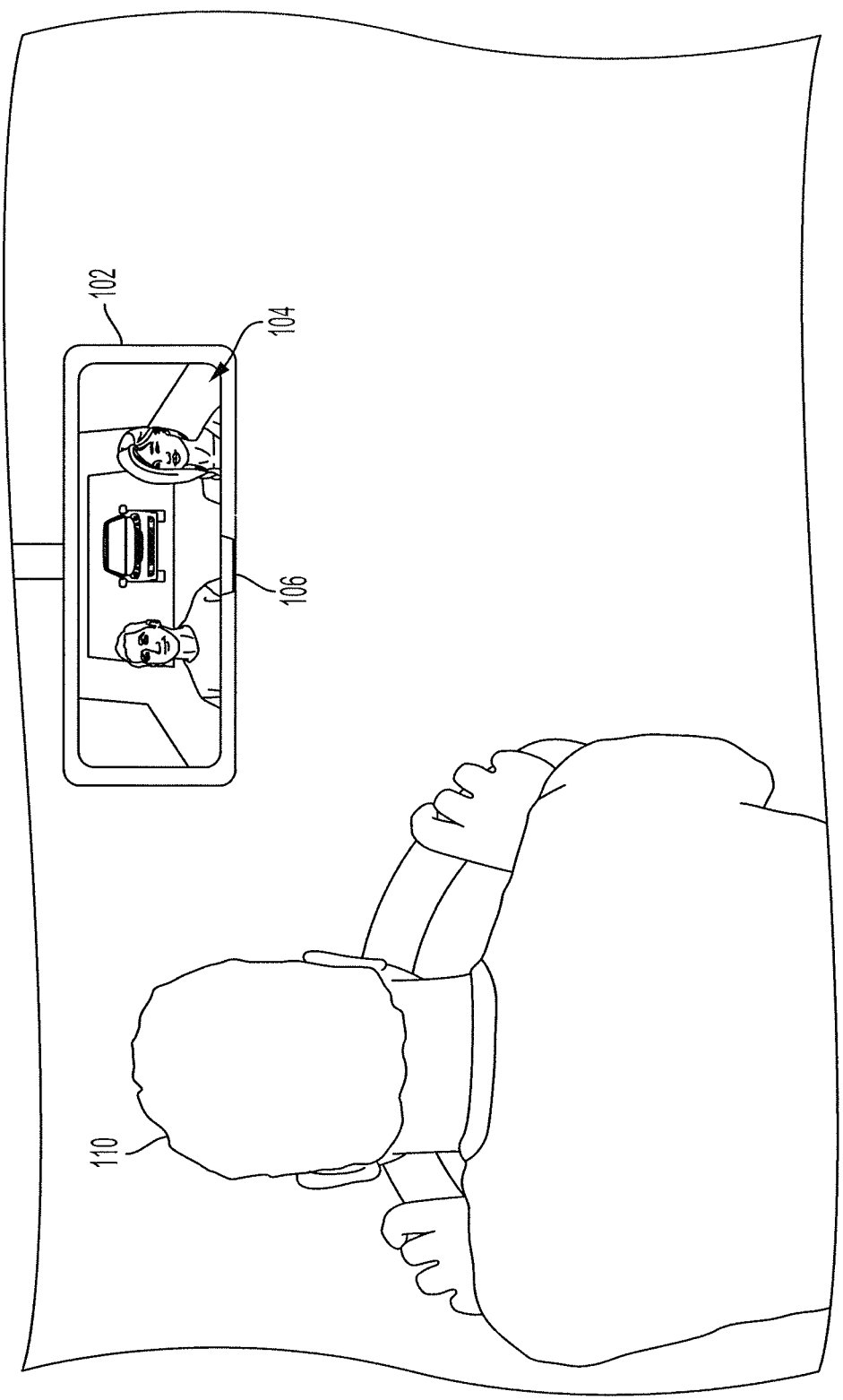

E-MIRROR AUTOMATIC POSITION ADJUSTMENT SYSTEM

BACKGROUND

1. Field

This specification relates to a system and a method for automatically adjusting the position of a camera to provide images to a driver.

2. Description of the Related Art

Conventional rear-view mirrors are mirrors located inside of a vehicle and in front of a driver. These conventional rear-view mirrors are aimed toward the rear of the vehicle and provide a reflection of objects behind the driver and/or the vehicle. These conventional rear-view mirrors may be used to observe the objects behind the driver, such as other passengers of the vehicle or cargo carried by the vehicle. These conventional rear-view mirrors may also be used to observe other vehicles, pedestrians, or any other object in the environment behind the vehicle.

However, when the vehicle has tall occupants or cargo, view of the environment behind the vehicle may be obscured, and the driver may not be able to view the environment behind the vehicle using the conventional rear-view mirror. Thus, there is a need for an improved rear-view mirror.

SUMMARY

What is described is a system for providing a view of an environment behind a vehicle. The system includes a camera located on a track and connected to the vehicle, the camera configured to detect image data of the environment behind the vehicle. The system also includes an actuator configured to move a position of the camera along the track. The system also includes an electronic control unit (ECU) connected to the camera and the actuator. The ECU is configured to determine, based on the image data, whether the view of the environment behind the vehicle is obscured. The ECU is also configured to adjust, using the actuator, the position of the camera along the track when the view of the environment behind the vehicle is obscured until the view of the environment behind the vehicle is unobscured or less obscured. The system also includes a rear-view mirror connected to the ECU and configured to display the view of the environment behind the vehicle.

Also described is a method for providing a view of an environment behind a vehicle. The method includes detecting, by a camera connected to the vehicle, image data of the environment behind the vehicle. The method also includes determining, by an electronic control unit (ECU), based on the image data, whether the view of the environment behind the vehicle is obscured by cargo carried by the vehicle. The method also includes automatically adjusting, using one or more actuators, the position of the camera until the view of the environment behind the vehicle is unobscured or less obscured. The method also includes displaying, by a rear-view mirror display screen, the unobscured or less obscured view of the environment behind the vehicle.

Also described is a system for providing a view of an environment behind a vehicle. The system includes a plurality of cameras located on a track and connected to the vehicle, each camera of the plurality of cameras configured to detect image data of the environment behind the vehicle. The system also includes an electronic control unit (ECU) connected to the plurality of cameras. The ECU is configured to determine a composite image of the view of the environment behind the vehicle based on the image data detected by the plurality of cameras. The ECU is also configured to determine, based on the image data, whether a view of the environment behind the vehicle along a lengthwise centerline axis of the vehicle is obscured. The ECU is also configured to identify a portion of the composite image that is unobscured or least obscured. The system also includes a rear-view mirror connected to the ECU and configured to display the identified portion of the composite image that is unobscured or least obscured.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIGS. 1A-1B illustrate a driver using an e-mirror, according to various embodiments of the invention.

DETAILED DESCRIPTION

Disclosed herein are systems, vehicles, and methods for automatically providing an unobstructed or least-obstructed view of the environment behind the vehicle to a driver of the vehicle. The systems, vehicles, and methods disclosed herein determine whether a view of the environment behind the vehicle is obstructed. The view of the environment behind the vehicle may be obstructed by cargo of the vehicle or other objects attached to the vehicle. When the view of the environment is obstructed, the camera used to provide the view of the environment behind the vehicle may be moved to a location that is unobstructed or obstructed to a lesser degree.

This automatic adjustment of camera position allows the driver to have an improved view of the environment behind the vehicle as compared to conventional rear-view mirrors, which are fixed in position and merely reflect light to show what is behind the driver. By providing an improved view of the environment behind the vehicle, safety of the driver, safety of occupants of the vehicle driven by the driver, and safety of any other individuals sharing the road with the driver is improved. By using the system and method described herein, vehicles may be made safer, and road safety as a whole may be improved.

Figure 1B:
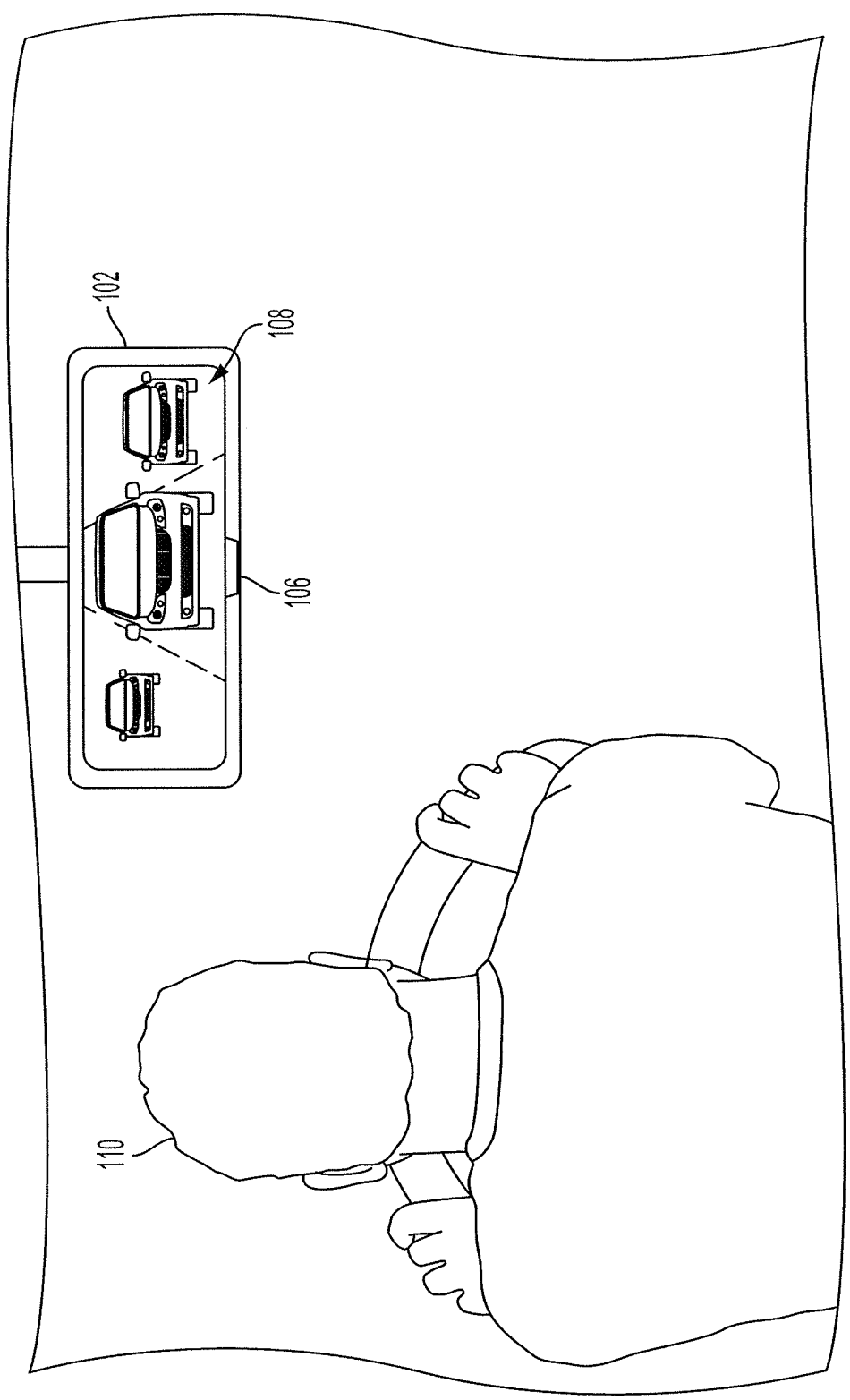

FIGS. 1A-1B illustrate use of an e-mirror. As used herein, "e-mirror" may refer to use of a camera or other image sensor to detect image data behind a vehicle and to display the image data on a display screen within the vehicle. The display screen may be integrated into an existing mirror (e.g., a rear-view mirror or a side-view mirror). In this way, the camera and the display screen comprise an electronic mirror that behaves and functions similarly to a conventional mirror.

FIG. 1A illustrates a driver 110 and a rear-view mirror 102 that is an e-mirror. The rear-view mirror 102 may have a first mode where the rear-view mirror 102 reflects light and behaves as a conventional mirror. This first mode is shown in FIG. 1A. The rear-view mirror 102 in the first mode shows a reflection 104 of objects behind the driver 110. As shown in FIG. 1A, passengers and a trailing vehicle are shown in the reflection 104 from the rear-view mirror 102. The rear-view mirror 102 may be switched to a second mode by engaging a button 106.

FIG. 1B illustrates the driver 110 and the rear-view mirror 102 that is an e-mirror of FIG. 1A. The rear-view mirror 102 has a second mode where the rear-view mirror 102 displays image data detected by a camera facing a rearward direction of the vehicle. The second mode may be activated by engaging the button 106. Further engaging of the button 106 may toggle between the first mode and the second mode. While a button 106 is illustrated in FIGS. 1A and 1B, any other switch or triggering mechanism may be used, such as a touchscreen button, a switch, a microphone for detecting a voice command, or a sensor for detecting a gesture, for example. The rear-view mirror 102 may also be automatically switched to the second mode when the rear-view mirror 102 (or camera) detects an obstruction or partial obstruction.

When in the second mode, the rear-view mirror 102 may display objects behind the vehicle with higher clarity and detail than a conventional mirror or the rear-view mirror 102 operating in the first mode. As shown in FIG. 1B, more vehicles are shown in the display 108 as compared to the reflection 104 of FIG. 1A. When the camera used by the rear-view mirror 102 is directed in a rearward direction and located behind the rearmost row of seats, objects or occupants within the vehicle may not be seen in the display 108.

Figure 2:
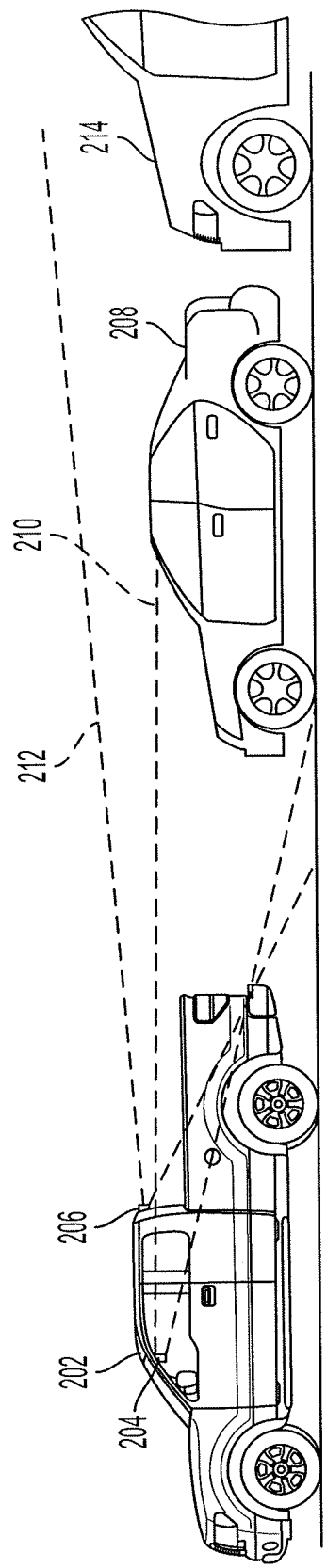
FIG. 2 illustrates respective fields of view of a conventional rear-view mirror and an e-mirror, according to various embodiments of the invention.

FIG. 2 illustrates a side view of the vehicle with the e-mirror. The vehicle 202 has a rear-view mirror 204 similar to rear-view mirror 102. When operating in the first mode (shown in FIG. 1A), the rear-view mirror 204 may have a first field of view 210. The first field of view 210 includes portions of the interior of the vehicle 202 as well as a trailing vehicle 208.

The rear-view mirror 204 may also operate in the second mode (shown in FIG. 1B) using a camera 206. The camera 206 may be located on an exterior surface of the vehicle 202 or may be located inside of the vehicle and adjacent to (e.g., right behind) a rear window. The image data detected by the camera 206 is displayed on the rear-view mirror 204 when operating in the second mode. When operating in the second mode, the rear-view mirror 204 may have a second field of view 212. The second field of view 212 includes the trailing vehicle 208 and may include other vehicles, including a second trailing vehicle 214. The first field of view 210 may not include the second trailing vehicle 214. Accordingly, use of the rear-view mirror 204 in the second mode may be useful to the driver of the vehicle 202 for expanding the field of view of objects behind the vehicle 202.

The camera 206 may be located near a centerline axis of the vehicle 202. In some situations, cargo of the vehicle 202 may coincide with the centerline axis of the vehicle 202 and may obstruct the view of the camera 206. For example, the vehicle 202 is shown as being a pickup truck, and a large object (e.g., a couch, a dresser, an appliance, a motorcycle, boxes, etc.) in the truck bed may obstruct the view of the camera 206.

Figure 3A:
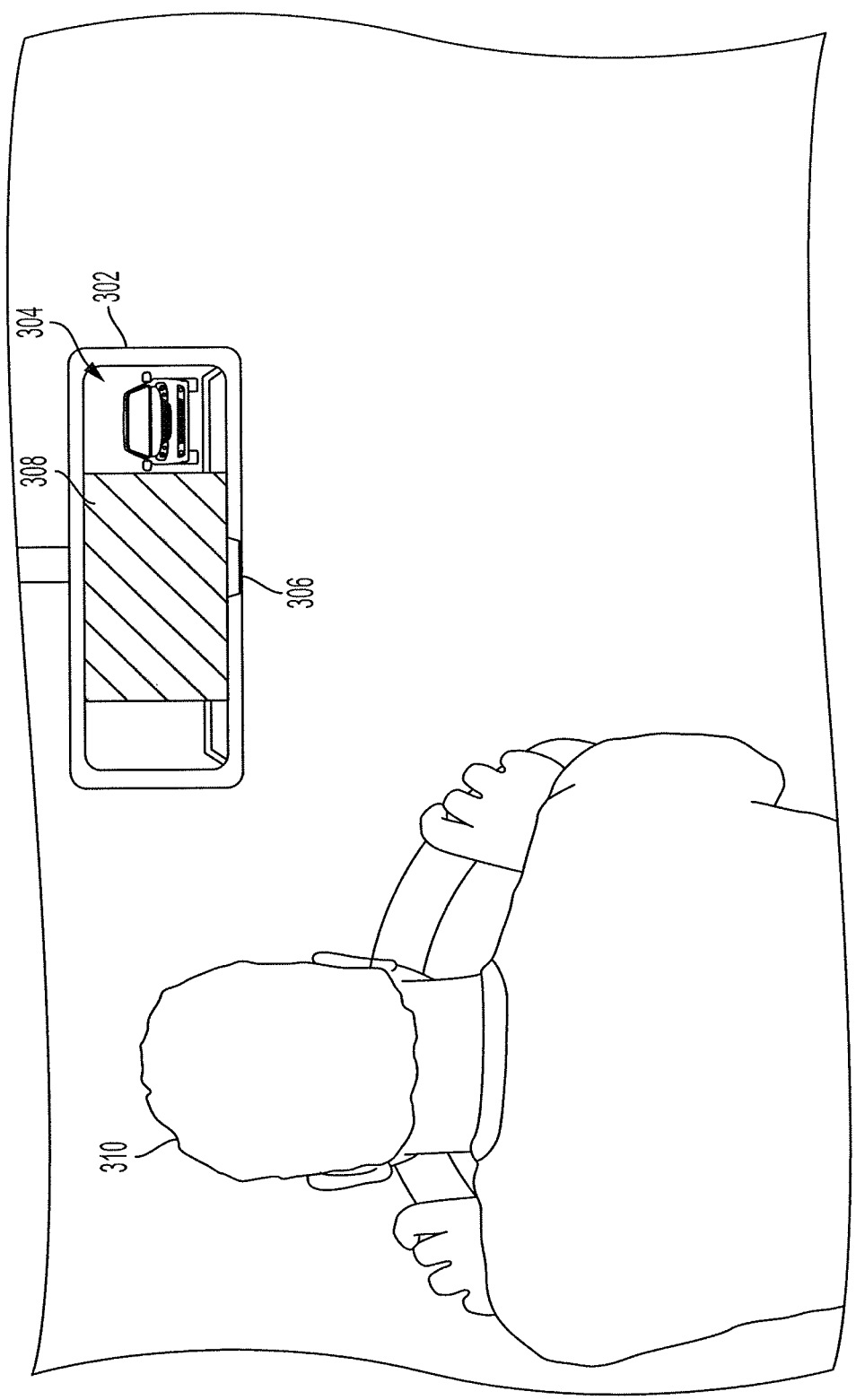
FIGS. 3A-3C illustrate a driver using the e-mirror automatic position adjustment system, according to various embodiments of the invention.

FIG. 3A illustrates a driver 310 of a pickup truck using a rear-view mirror 302 similar to rear-view mirrors 102 and 204. The rear-view mirror 302 is in a first mode and the reflection 304 shows a large object 308 located in the truck bed and a vehicle following behind the pickup truck. Upon engaging the button 306, the rear-view mirror 302 may be changed to a second mode, shown in FIG. 3B.

Figure 3B:
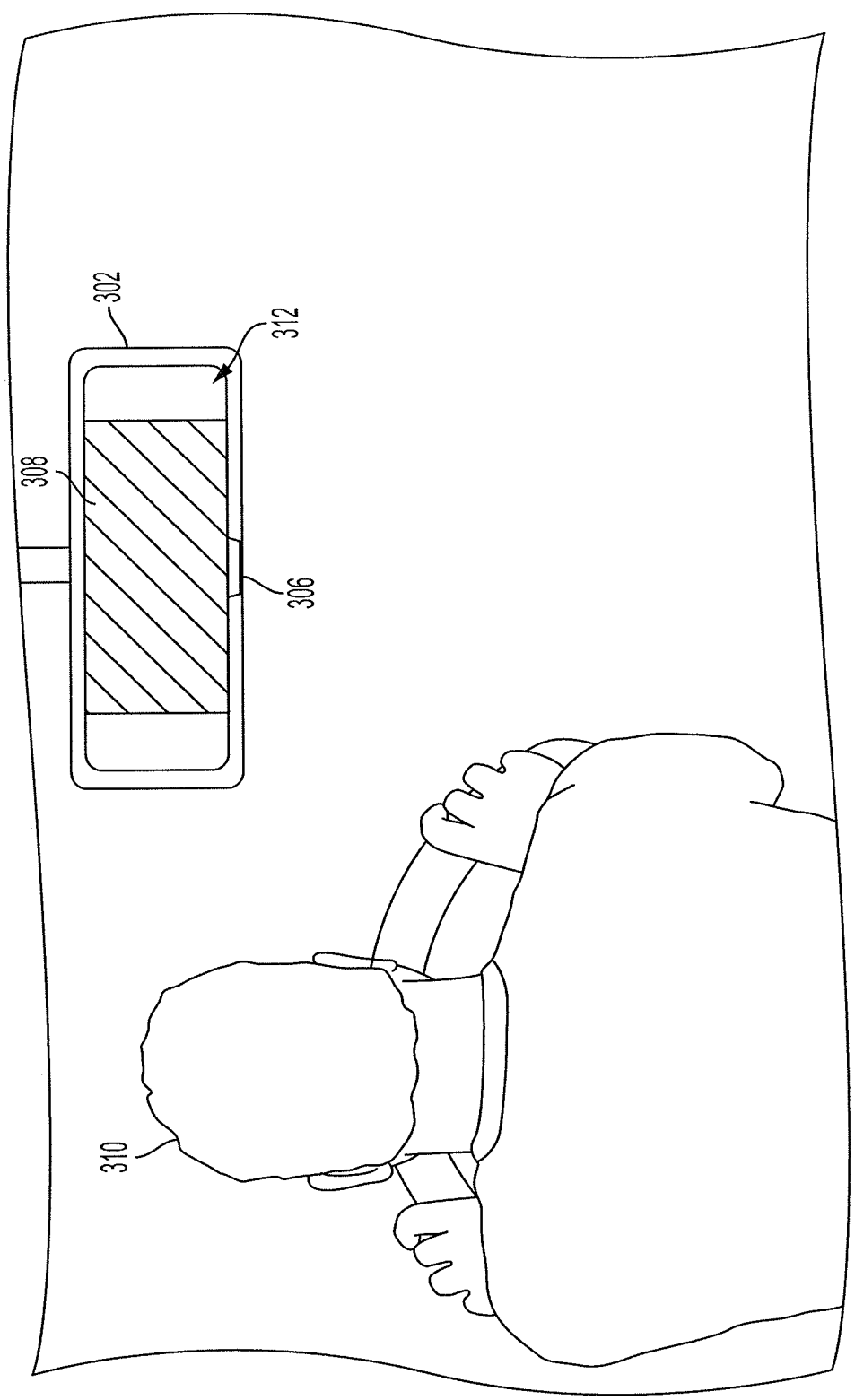

In the second mode, a camera (e.g., camera 206) is used to detect image data, and the image data is displayed by a display screen included in the rear-view mirror 302. The display 312 shows the large object 308. Since the large object 308 obscures the view, use of the camera to operate the rear-view mirror 302 in the second mode may not be useful to the driver. In some situations, as shown in FIGS. 3A and 3B, use of the rear-view mirror 302 in the second mode may be inferior to use of the rear-view mirror 302 in the first mode. However, if the camera is able to be moved to avoid being obscured by the large object 308, the second mode may be useful to the driver 310.

Figure 3C:
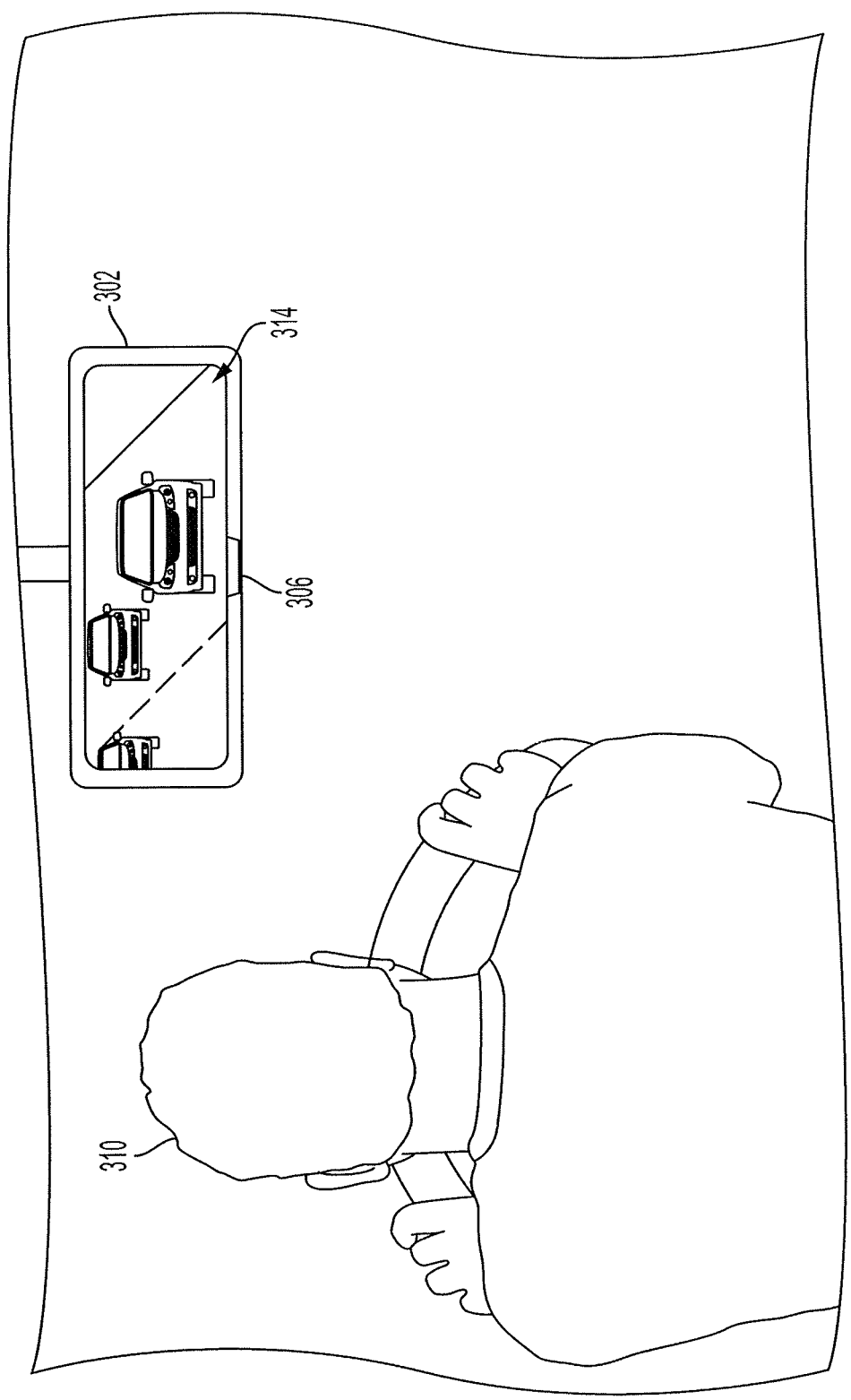

FIG. 3C illustrates the rear-view mirror 302 operating in the second mode, but with the camera moved to the driver's side direction (i.e., to the left side of the vehicle from the driver's point of view). When the camera is moved, the large object 308 is able to be avoided, and an unobstructed view may be provided to the driver 310. As compared to the views shown in FIGS. 3A and 3B, the view of FIG. 3C shows additional detail of vehicles and objects behind the pickup truck that were not able to be viewed previously.

As shown in FIG. 3C, by moving the camera to the driver's side, the perspective and angle of view of the environment behind the pickup truck may be skewed. In some embodiments, image processing is performed on the image data detected by the moved camera to account for the shift in perspective such that a view may be provided to the driver as if the camera were still in its default position along the lengthwise centerline axis of the vehicle.

FIGS. 4A-4F illustrate a rear perspective view of a vehicle 402 similar to vehicle 202. The vehicle 402 includes a camera 406 similar to camera 206. The camera 406 is connected to a track 404 and the camera 406 may move along the track 404. The vehicle 402 has a lengthwise centerline axis 414 and the track 404 runs along a track axis 412 that is perpendicular to the lengthwise centerline axis 414. The track 404 may be positioned on or integrated into a rear body panel above the rear window glass. An object 408 is located within a storage area of the vehicle 402.

Figure 4A:
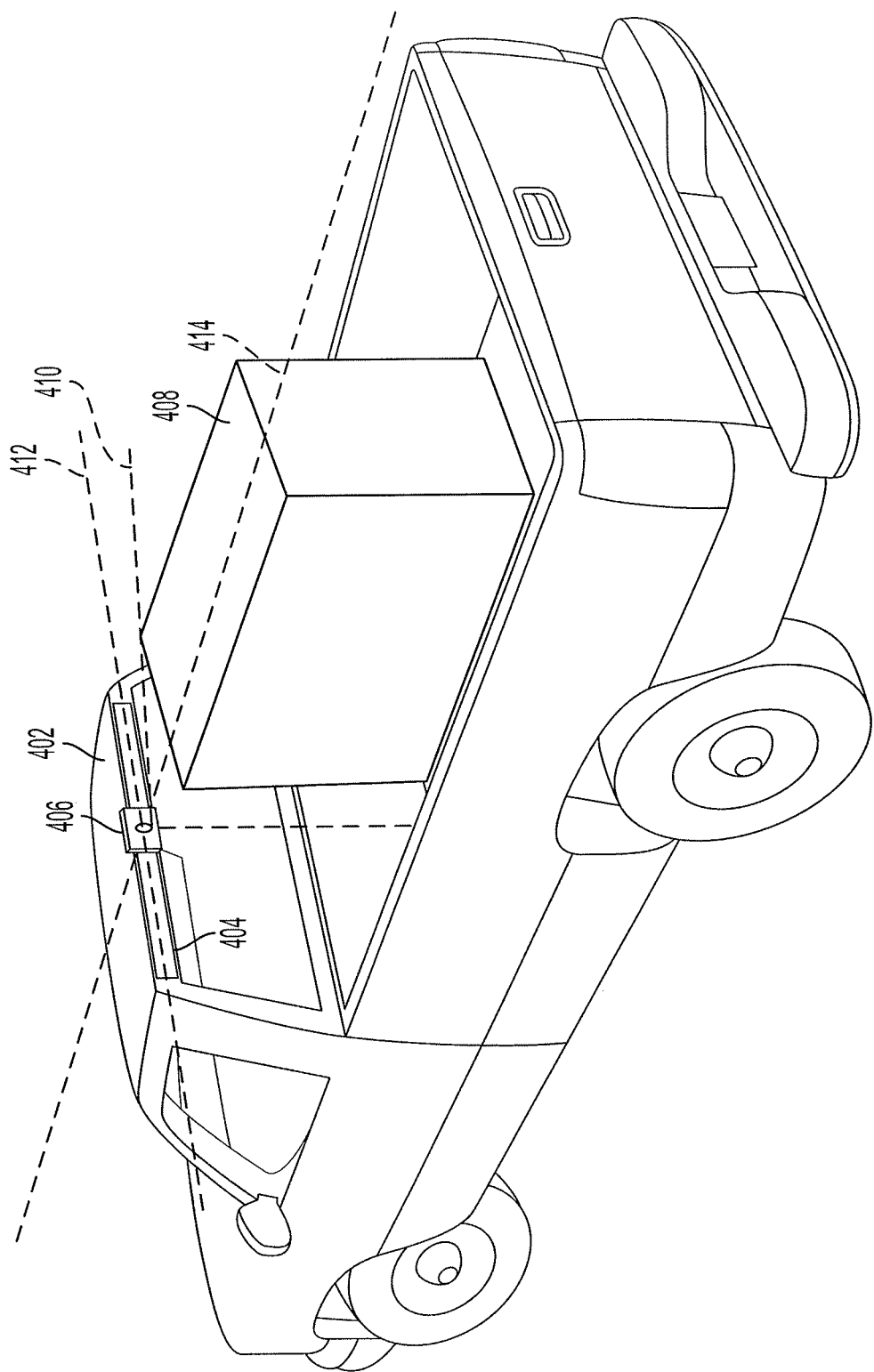
FIGS. 4A-4F illustrate various positions of the e-mirror automatic position adjustment system, according to various embodiments of the invention.

FIG. 4A shows the camera 406 in a default position. In the default position, the camera 406 is located along the track 404 at a location in line with the lengthwise centerline axis 414 of the vehicle 402. The field of view 410 of the camera 406 in the default position is obscured by the object 408. Accordingly, the display shown by the rear-view mirror within the passenger cabin of the vehicle 402 is obscured by the object 408 (as illustrated in FIG. 3B). In order to improve the view provided by the camera 406, the camera 406 may be moved along the track 404.

Figure 4B:
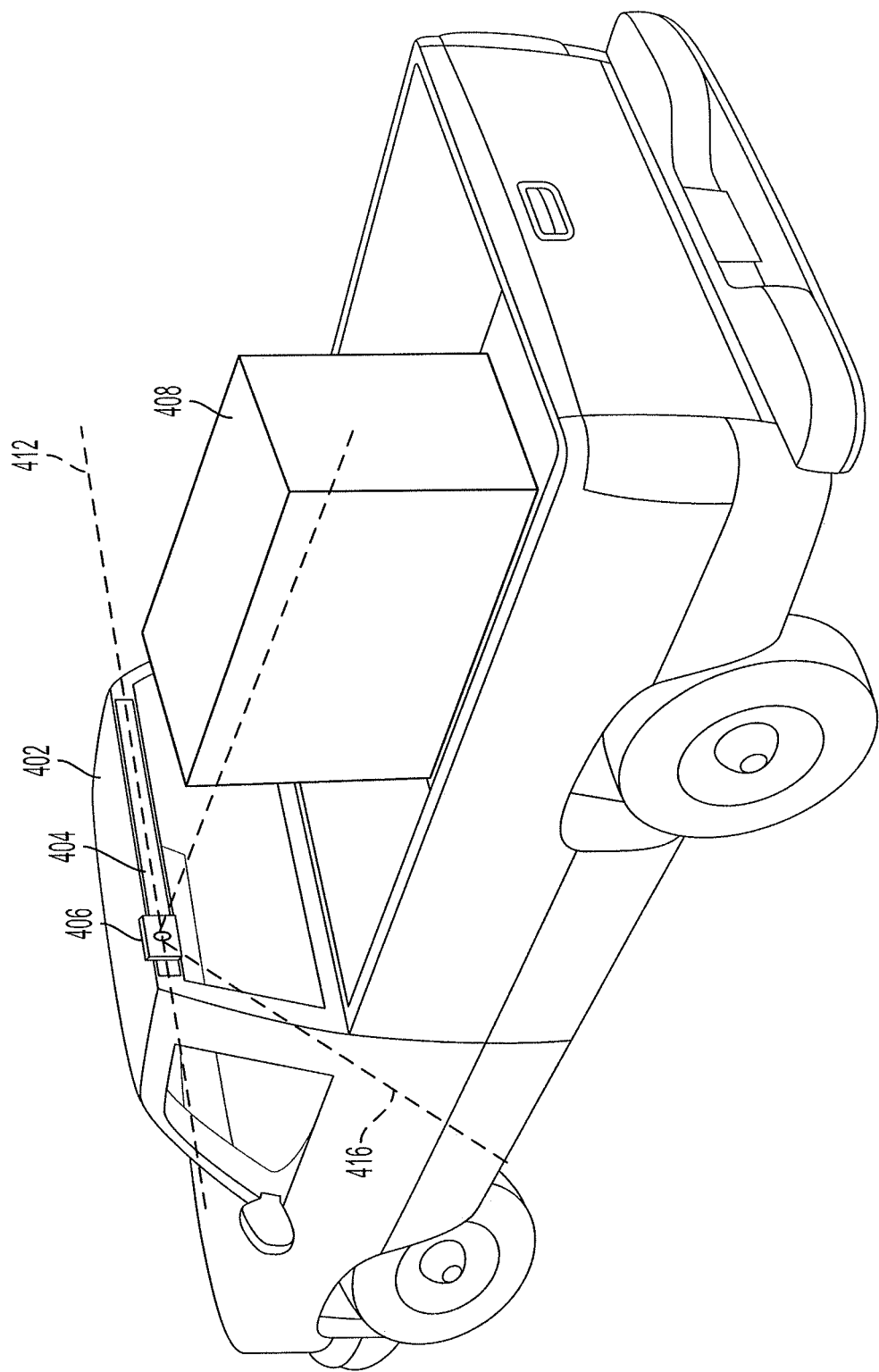

FIG. 4B shows the camera 406 moved along the track 404 toward the driver's side of the vehicle 402. The camera 406 moves along the track axis 412 in a direction perpendicular to the lengthwise centerline axis 414 (shown in FIG. 4A). The camera 406 now has a field of view 416 that avoids the object 408. Accordingly, the display shown by the rear-view mirror within the passenger cabin of the vehicle 402 is no longer obscured by the object 408 (as illustrated in FIG. 3C).

In some embodiments, the camera 406 automatically moves along the track 404 until the object 408 is no longer in the field of view or until the end of the track 404 has been reached. Once the object 408 is no longer in the field of view or the end of the track 404 has been reached, the camera 406 may stop moving along the track 404. In some embodiments, image processing may be performed on the image data detected by the camera 406 to detect objects that obscure the field of view of the camera 406 and objects that are a part of the environment behind the vehicle 402. For example, an obscuring object (e.g., object 408) may be identified and distinguished from non-obscuring objects, such as another vehicle travelling behind the vehicle 402 or a traffic sign or a pedestrian. Machine learning techniques may be used to detect the various objects in the image data, and to improve upon future detection of objects in the image data detected by the camera 406.

Figure 4C:
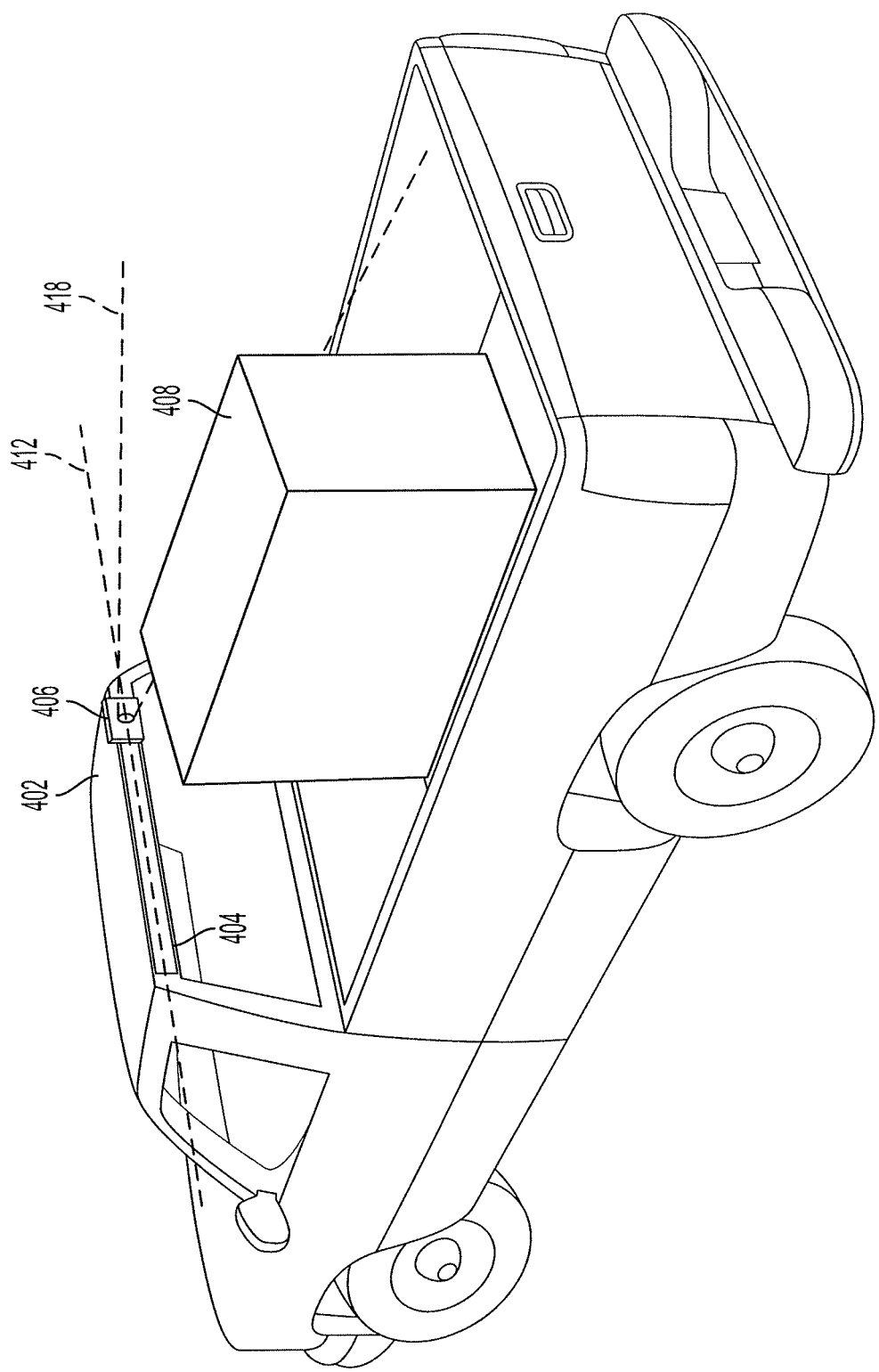

FIG. 4C shows the camera 406 moved along the track 404 toward the passenger's side of the vehicle 402. The camera 406 has a field of view 418 that avoids the object 408 and shows the environment behind the vehicle and to the passenger's side. In some embodiments, the camera 406 may move to the driver's side of the track 404 until the object 408 is out of the field of view or the end of the track is reached. The camera 406 may then move to the passenger's side of the track 404 until the object 408 is out of the field of view or the other end of the track is reached. The image data detected from both the driver's side of the track and the passenger's side of the track may be combined by a control unit (e.g., ECU) of the vehicle 402 and a composite image may be provided to the driver via the rear-view mirror that simulates a field of view 410 but without the object 408.

Figure 4D:
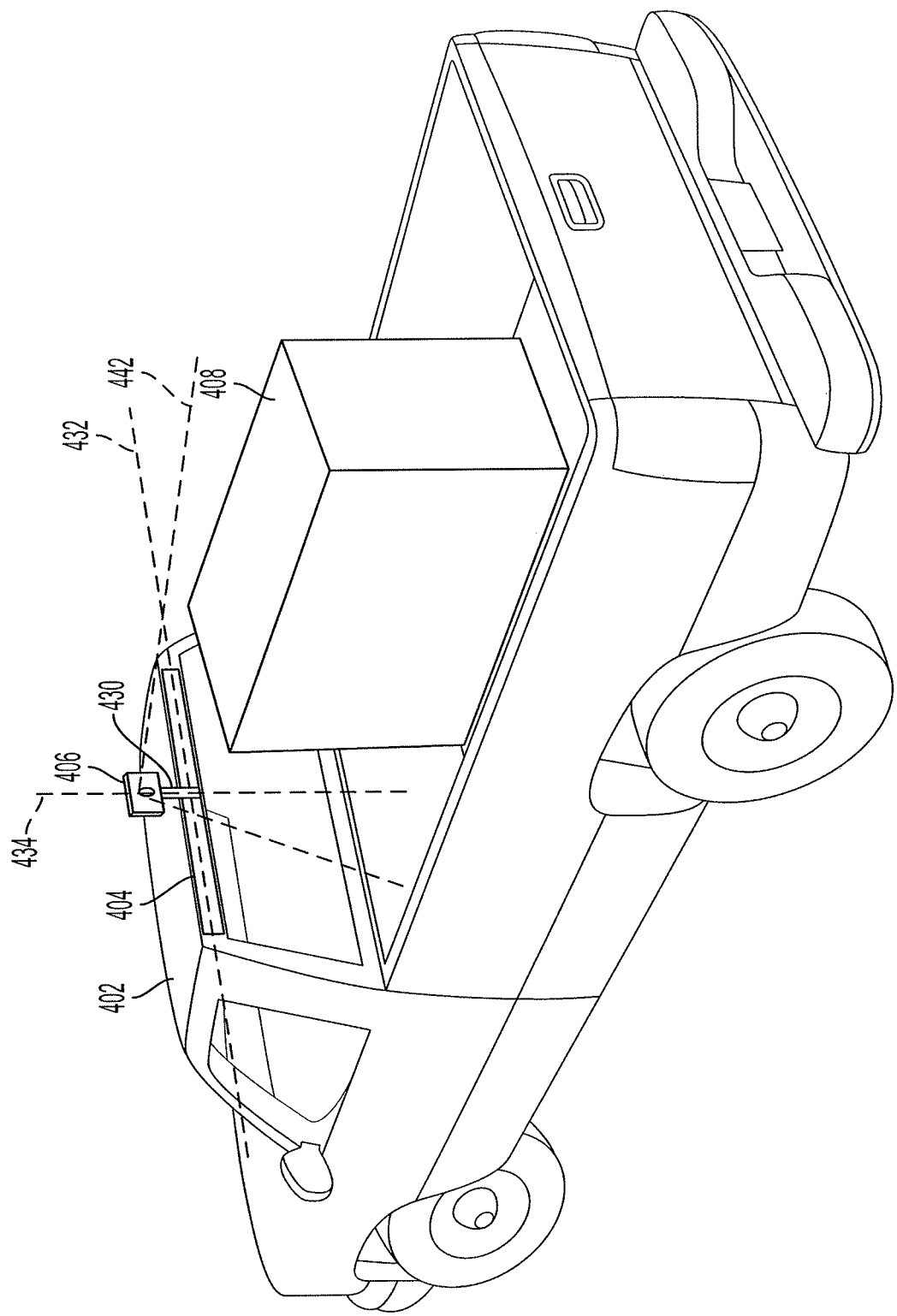

In addition to lateral movement, the camera 406 may be moved vertically to attempt to avoid having its field of view obscured by the object 408. FIG. 4D illustrates the camera 406 being moved vertically by an extension 430. When the camera 406 is moved vertically, the field of view 442 may be such that the object 408 is no longer within view, and the elevated view may be shown on the rear-view minor inside the vehicle 402. The extension may move along a vertical axis 434 that is perpendicular to the track axis 432.

Figure 4E:
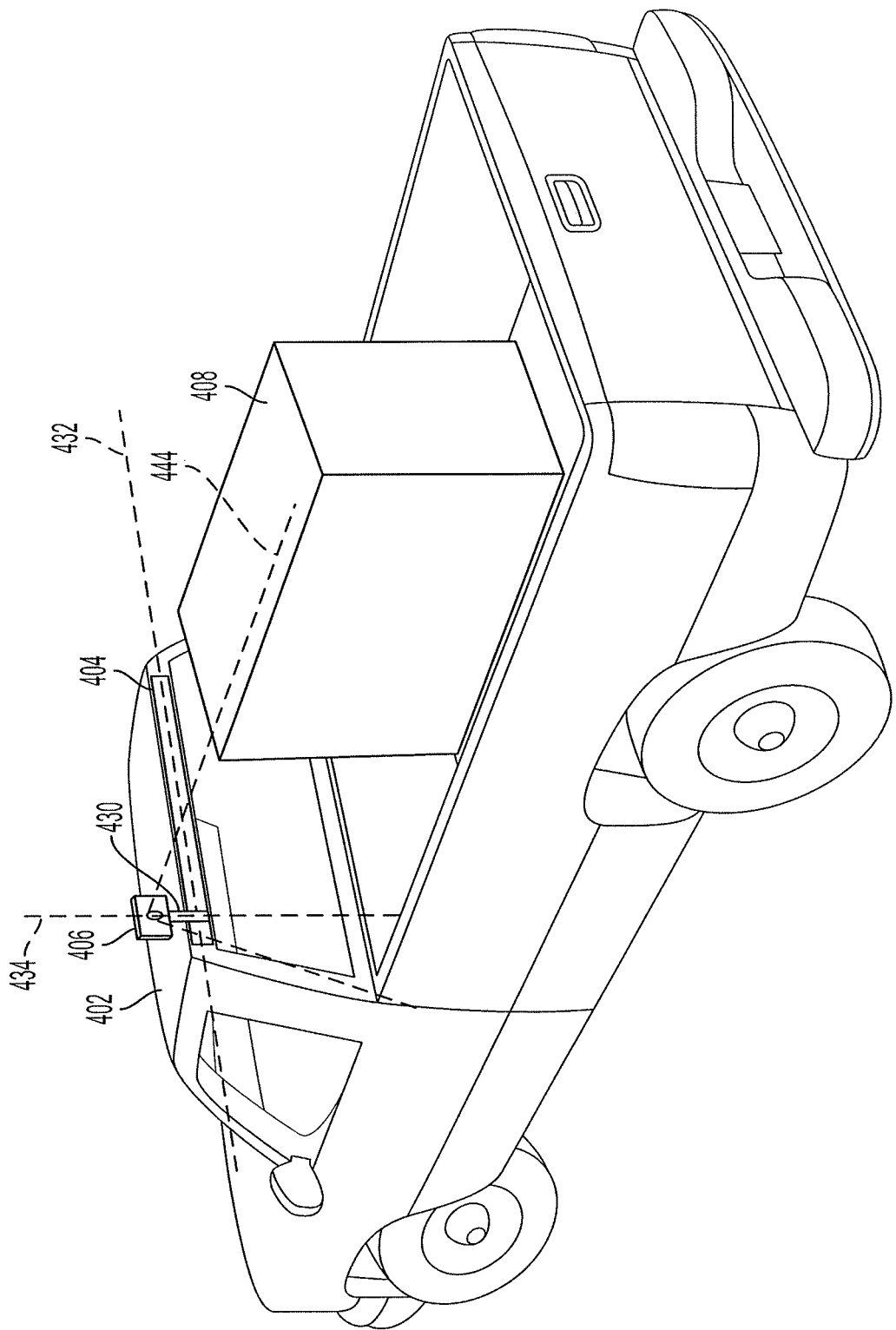
Figure 4F:
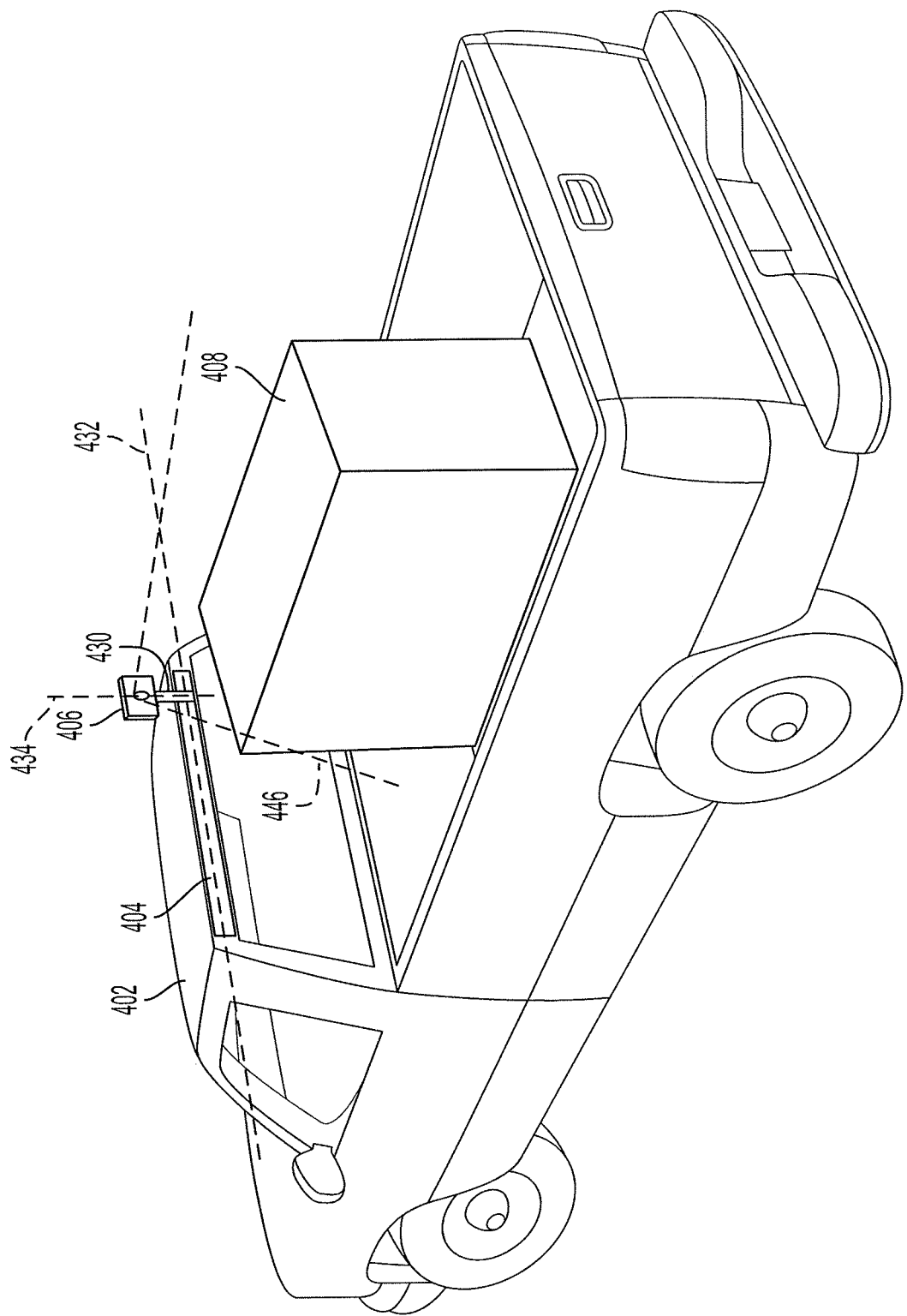

FIG. 4E illustrates the camera 406 being moved toward the driver's side along the track 404 and moved upward using the extension 430 to provide an elevated offset field of view 444. Similarly, FIG. 4F illustrates the camera 406 being moved toward the passenger's side along the track 404 and moved upward using the extension 430 to provide another elevated offset field of view 446. In some embodiments, the extension 430 has an extension length, and the camera 406 may be moved upward by any height up to the extension length. In this way, the camera 406 may be located at any point along a plane established by movement along the track 404 and along the extension 430.

In some embodiments, the camera 406 is automatically moved laterally along the track 404 and/or vertically along the extension 430 until an unobstructed or minimally-obstructed view is achieved. The image data detected by the camera 406 may be automatically analyzed by a control unit (e.g., ECU) of the vehicle 402 to determine an obstruction level at any given camera location. For example, the camera 406 may start at the default position shown in FIG. 4A. The control unit may detect the presence of an object 408 based on an automatic analysis of the image data detected by the camera 406. The control unit may then cause the camera 406 to be moved along the track 404 as shown in FIGS. 4B and 4C. The control unit may also cause the camera 406 to be moved upward along the extension 430 as shown in FIG. 4D and also along the track 404 as shown in FIGS. 4E and 4F. Based on image data detected at each of these positions of the camera 406, the control unit may determine an optimal location for the camera 406 to be located to provide the driver with a least-obstructed view of the environment behind the vehicle 402. In some embodiments, with each position of the camera 406, the control unit may determine a percentage of the view provided to the driver that is obstructed by the object 408, and the position of the camera 406 where the percentage of the view is least obstructed may be determined. The camera 406 may be moved to that determined position so the display provided to the driver is least obstructed.

In some embodiments, this determination of best camera position may be performed when the vehicle 402 is initially turned on. In some embodiments, this determination of best camera position may be performed upon receiving instructions from the driver. In some embodiments, this determination of best camera position may be performed when cargo is detected as being loaded onto the vehicle 402 or when cargo is detected as being taken off of the vehicle 402. Detection of cargo loading or removal may be determined by the camera 406, an input from the driver, or from one or more weight sensors of the vehicle 402 configured to detect the presence of cargo in the vehicle 402, for example.

Figure 5A:
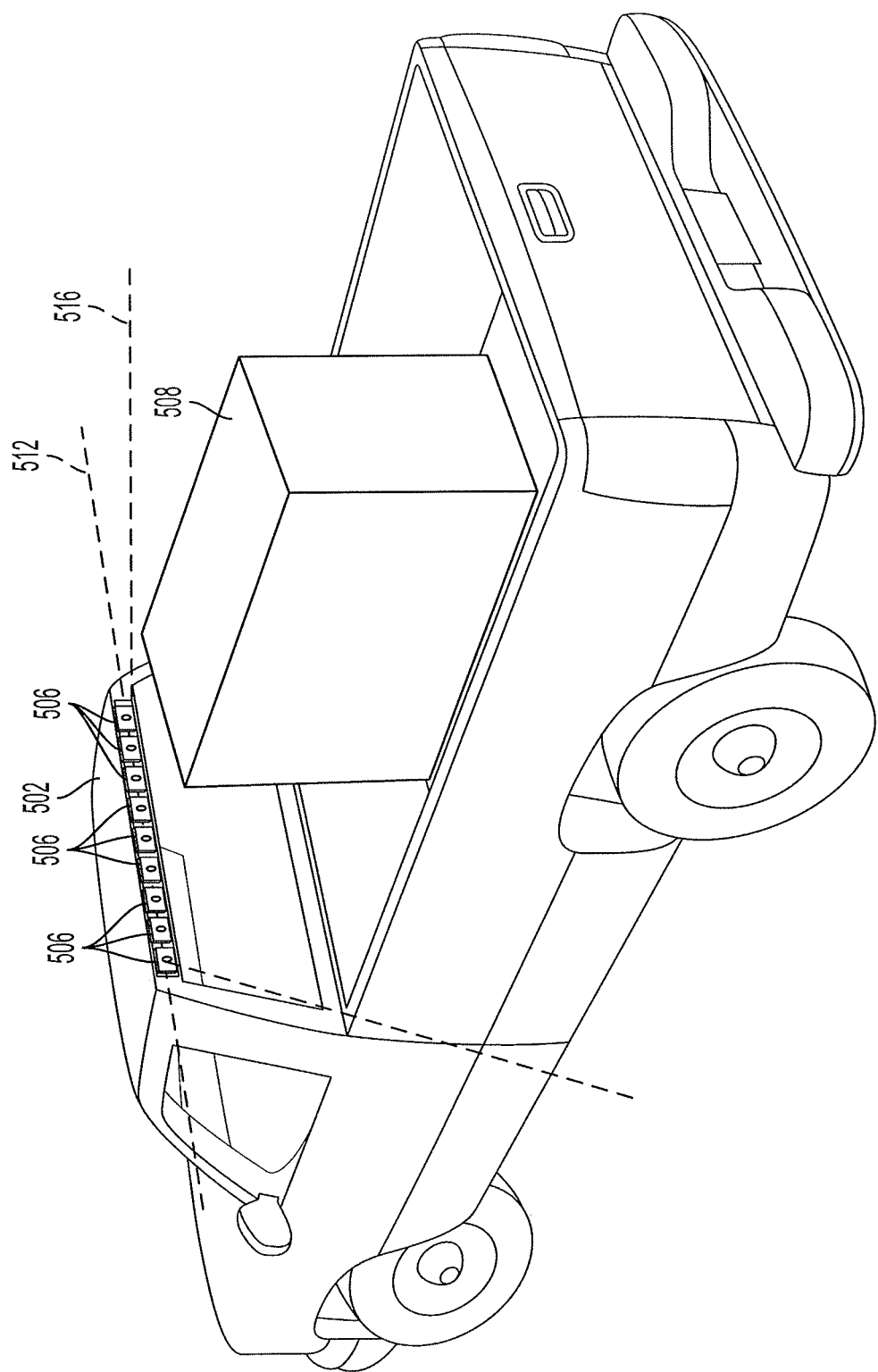
FIGS. 5A-5B illustrate various positions of another embodiment of the e-mirror automatic position adjustment system, according to various embodiments of the invention.
Figure 5B:
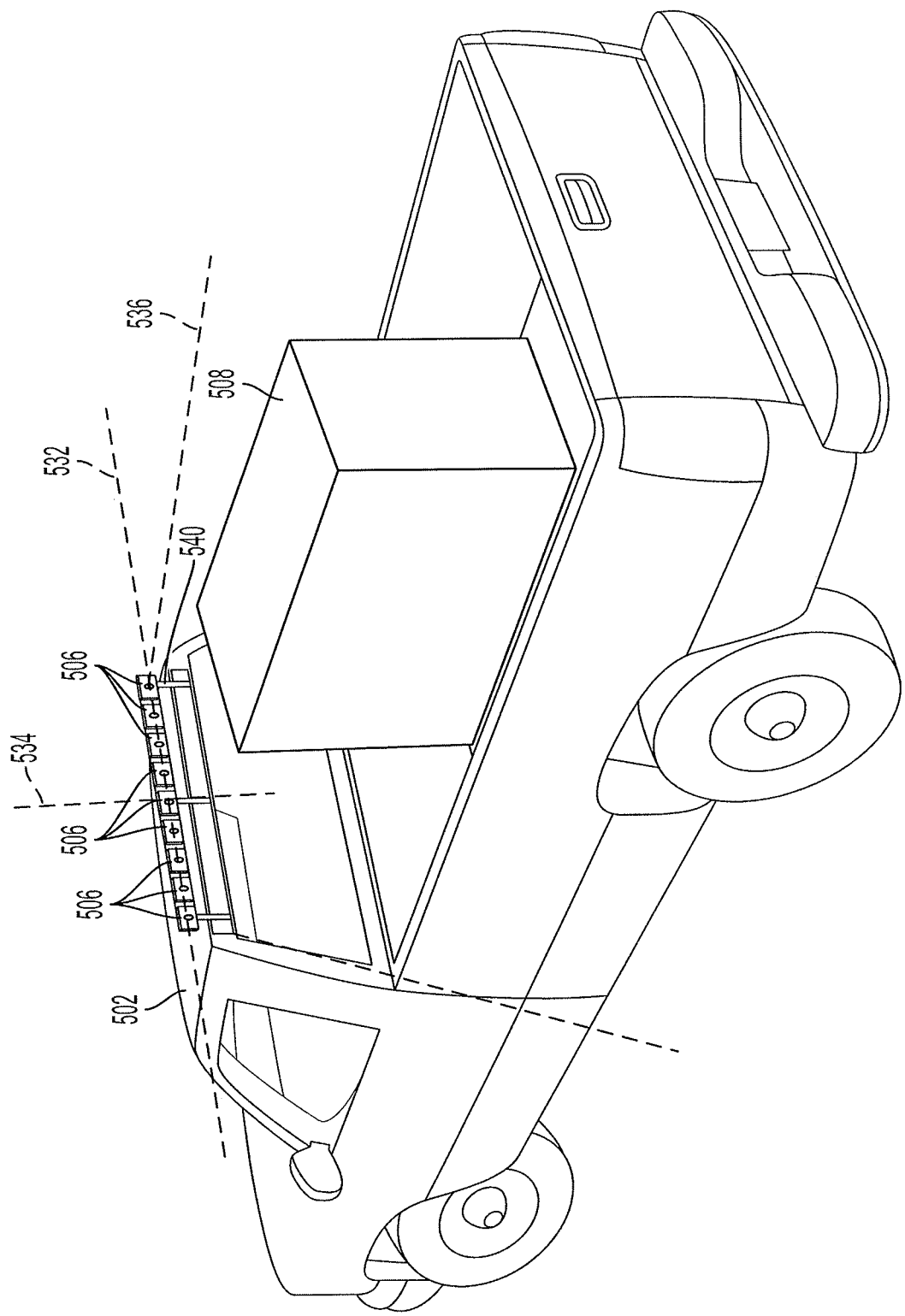

FIGS. 5A-5B illustrate a rear perspective view of a vehicle 502 similar to vehicle 202 and 402. The vehicle 502 includes multiple cameras 506 similar to camera 206 and 406. Instead of having a single camera moving along a track, vehicle 502 has multiple cameras 506 located along a track axis 512 of the vehicle 502. In some embodiments, the multiple cameras 506 span or substantially span the width of a rearmost window of the vehicle 502. The multiple cameras 506 may be positioned along a horizontal line or staggered at different heights. An object 508 is located within a storage area (e.g., a truck bed) of the vehicle 502.

As shown in FIG. 5A, the multiple cameras 506 provide a wide view 516 of the environment behind the vehicle 502, including the object 508. The image data detected by the multiple cameras 506 may be automatically analyzed by a control unit of the vehicle 502 and the control unit may determine a portion of the wide view 516 to display to the driver on a rear-view mirror display whereby the presence of the object 508 is minimized.

FIG. 5B illustrates the multiple cameras 506 being elevated by one or more extensions 540 similar to extension 430. The multiple cameras 506 may be elevated along a vertical axis 534 that is perpendicular to the track axis 532 and also perpendicular to a lengthwise centerline axis of the vehicle 502. The multiple cameras 506 are capable of capturing an elevated wide view 536 of the environment behind the vehicle 502. This elevated wide view 536 may include less obstruction from object 508 as compared to the wide view 516 in FIG. 5A.

In some embodiments, a control unit of the vehicle 502 may automatically analyze the image data from the multiple cameras 506 and may automatically move the multiple cameras 506 upward along the one or more extensions 540 until a position is determined where the view is least obstructed by the object 508. The control unit may automatically instruct one or more actuators to move the multiple cameras 506 to the determined position.

While FIGS. 4A-4F and 5A-5B illustrate use of the e-mirror position adjustment system on a pickup truck, the system may be used on any vehicle, as any vehicle may be capable of towing objects behind the vehicle or having its camera view obstructed by objects attached to the vehicle.

Figure 6:
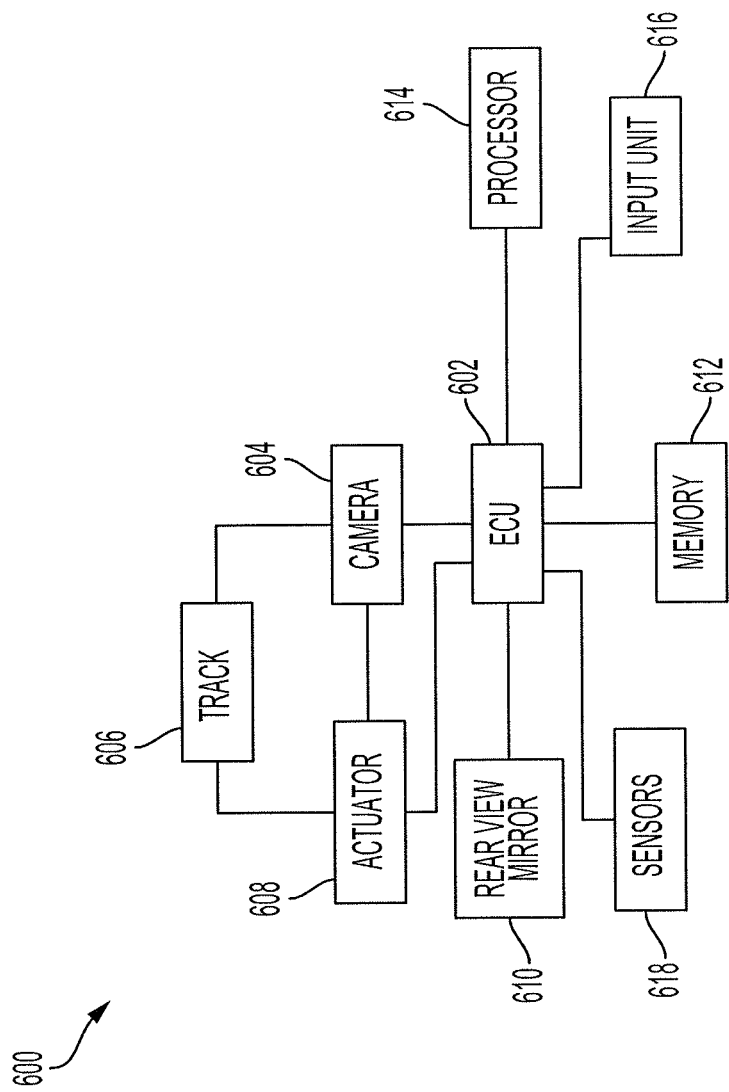
FIG. 6 is a block diagram of the e-mirror automatic position adjustment system, according to various embodiments of the invention.

FIG. 6 illustrates an example system 600, according to various embodiments of the invention. The system may be embodied in a vehicle (e.g., vehicle 202, 402, 502). The vehicle may have an automatic or manual transmission. The vehicle is a conveyance capable of transporting a person, an object, or a permanently or temporarily affixed apparatus. The vehicle may be a self-propelled wheeled conveyance, such as a car, a sports utility vehicle, a truck, a bus, a van or other motor or battery driven vehicle. For example, the vehicle may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle may be a semi-autonomous vehicle or an autonomous vehicle. That is, the vehicle may be self-maneuvering and navigate without human input. An autonomous vehicle may use one or more sensors and/or a navigation unit to drive autonomously. As used herein, "driver" may be used to refer to a human driver of the vehicle or one or more computer processors or control units operating the vehicle.

The vehicle also includes one or more computers or electronic control units (ECUs) 602, appropriately programmed, to control one or more operations of the vehicle. The one or more ECUs 602 may be implemented as a single ECU or in multiple ECUs. The ECU 602 may be electrically coupled to some or all of the components of the vehicle. In some embodiments, the ECU 602 is a central ECU configured to control one or more operations of the entire vehicle. In some embodiments, the ECU 602 is multiple ECUs located within the vehicle and each configured to control one or more local operations of the vehicle. In some embodiments, the ECU 602 is one or more computer processors or controllers configured to execute instructions stored in a non-transitory memory 612.

Although FIG. 6 illustrates all of the elements connected to the ECU 602, the elements of the vehicle may be connected to each other using a communications bus.

The system 600 includes a camera 604 (e.g., camera 206, 406, 506) configured to detect image data of the environment behind the vehicle. The camera 604 may be one or more cameras. In some embodiments, the camera 604 may be an image sensor, a video sensor, or a spatial sensor (e.g., RADAR or LIDAR). The camera 604 may be located near the rearmost window of the vehicle and may be inside the vehicle or outside the vehicle. As described herein, the ECU 602 may use the image data from the camera 604 to determine whether the view of the driver provided by the camera 604 is obscured by an object (e.g., object 308, 408, 508).

The camera 604 may be attached to the vehicle by a track 606 (e.g., track 404). The track 606 may be located inside of the vehicle or outside of the vehicle, alongside the camera 604. The camera 604 may be removably attached to the track 606 or may be fixedly attached to the track 606.

The camera 604 may also be connected to an actuator 608 configured to move the position of the camera 604 along the track 606. For example, the camera 604 may be connected to a belt spanning the track 606 and the actuator 608 may be a motor configured to rotate in a first direction and turn the belt, causing the camera 604 to move from a first end to a second end on the track 606. The motor may also rotate in a second direction and turn the belt, causing the camera 604 to move from the second end to the first end.

The actuator 608 may be one or more actuators. In some embodiments, the actuator 608 causes the camera 604 to move laterally (or horizontally) along the track 606 and vertically up or down an extension (e.g., extension 430, 540). For example, a first actuator moves the camera 604 laterally (or horizontally) along the track 606 and a second actuator moves the camera 604 vertically along the extension. The actuator 608 is connected to the ECU 602. The ECU 602 may instruct the actuator 608 to move the camera 604 to a particular position in order to provide a least-obstructed or unobstructed view to the driver via the rear-view mirror 610.

In some embodiments, the sensors 618 are configured to detect a change in the presence of cargo or a change in the positioning of cargo. For example, the sensors 618 may be weight sensors in the cargo bed of a pickup truck that are configured to detect changes in weight. In another example, the sensors 618 may be proximity sensors or presence sensors configured to detect changes in the presence of objects in the cargo bed. In some embodiments, the camera 604 may be used to determine a change in the presence of cargo or the positioning of cargo. The image data from the camera 604 may be analyzed to detect changes in the object presence and/or orientation.

When a change in the presence of the cargo or a change in the positioning of the cargo is detected by the sensors 618 or the camera 604, the ECU 602 may determine a new position for the camera 604, as the change in the presence of cargo or a change in the position of cargo may have changed the degree to which the view of the environment behind the vehicle is obscured. For example, a large piece of cargo may be removed, and when the sensors 618 detect the change in cargo, the ECU 602 may determine whether the view remains obscured. If the view is no longer obscured, the ECU 602 may return the camera 604 to the initial, default position along the lengthwise centerline axis of the vehicle. If the view from the initial, default position is obscured, the ECU 602 may adjust the position of the camera 604 until the view is least obscured or unobscured. In some embodiments, the ECU 602 has a preference for positioning the camera 604 as close to the original, default position as possible.

The rear-view mirror 610 (e.g., rear-view mirror 102, 204, 302) may be configured to operate in a first mode where the rear-view mirror 610 reflects light and operates as a conventional rear-view mirror does. The rear-view mirror 610 may also be configured to operate in a second mode where the rear-view mirror 610 acts as a display screen for displaying image data detected by the camera 604.

The memory 612 is connected to the ECU 602 and may be connected to any other component of the vehicle. The memory 612 may be configured to store data used by the ECU 602 in identifying objects within the image data detected by the camera 604. The image data may include other vehicles, pedestrians, or cargo, for example, and the ECU 602 may use machine learning techniques to identify one or more objects in the image data. The memory 612 may also be configured to store user preferences of camera position or use, or any other data described herein.

An input unit 616 is also connected to the ECU 602. The input unit 616 is configured to receive input from a user. The input unit 616 may be a touchscreen, a keyboard, a button or switch, a microphone, or a sensor configured to detect gestures. In some embodiments, the user may use the input unit 616 to control the position of the camera 604. The ECU 602 may receive camera movement input from the user via the input unit 616 and cause the camera 604 to move using the actuator 608. In some embodiments, the ECU 602 may prevent the user from manually controlling the position of the camera 604 when the vehicle is not at a complete stop or when the vehicle is in drive or reverse.

In some embodiments, when the vehicle is an autonomous vehicle or a semi-autonomous vehicle, the system 600 may be used to provide unobstructed or least-obstructed views of the environment behind the vehicle for the ECU 602 to use when autonomously operating the vehicle.

As used herein, a "unit" may refer to hardware components, such as one or more computer processors, controllers, or computing devices configured to execute instructions stored in a non-transitory memory.

Figure 7:
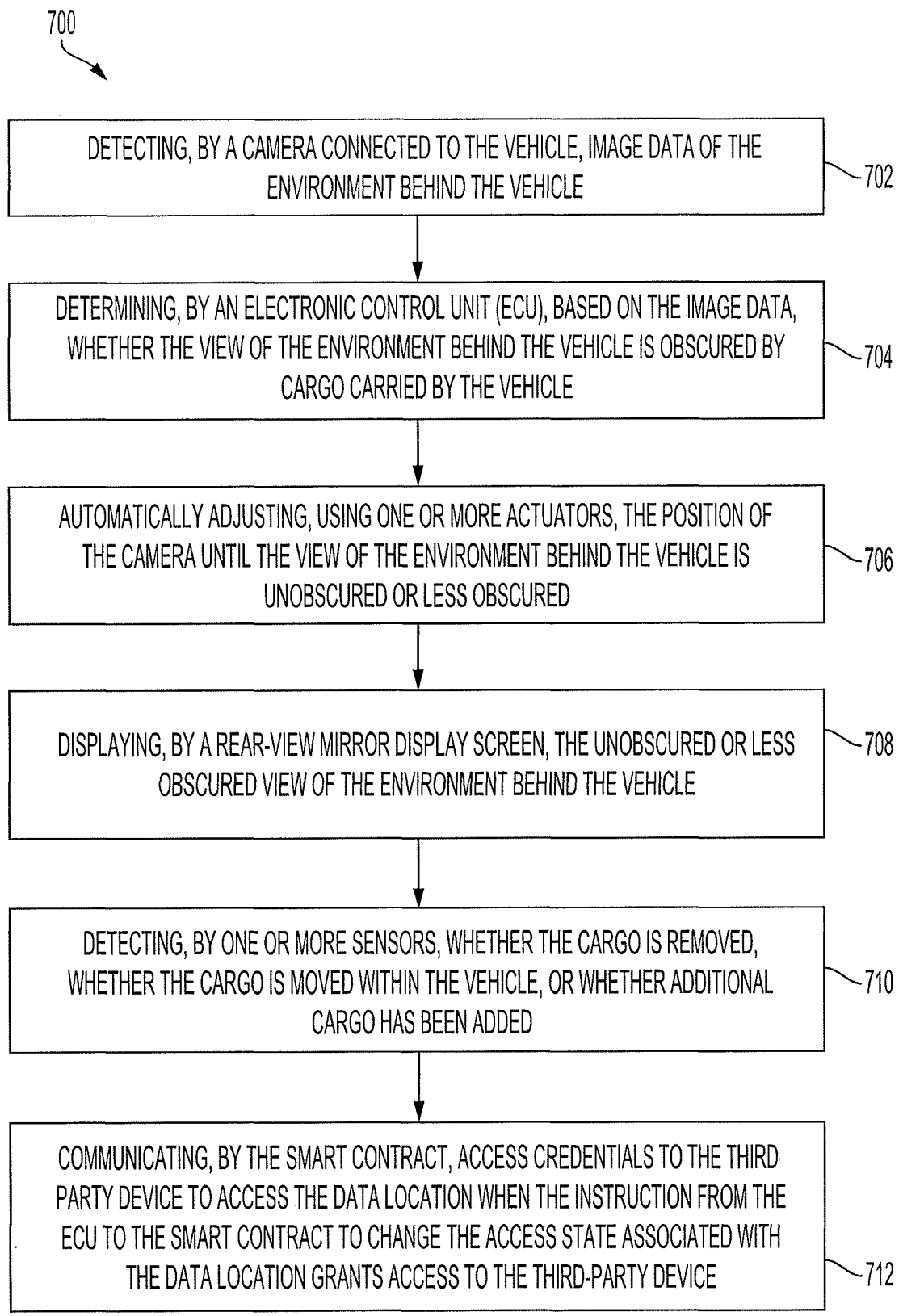
FIG. 7 illustrates a flow diagram of a process performed by the e-mirror automatic position adjustment system, according to various embodiments of the invention.

FIG. 7 illustrates a flowchart of a process 700 performed by the systems described herein. The process 700 may be a method for providing a view of an environment behind a vehicle. The vehicle may be carrying cargo in a cargo area of the vehicle (e.g., a truck bed) that obscures the view of the environment behind the vehicle or the vehicle may have an attached object that obscures the view of the environment behind the vehicle.

A camera (e.g., camera 604) detects image data of the environment behind the vehicle (e.g., vehicle 202, 402, 502). The camera may be a single camera connected to a track and configured to move along the track. The track may be located along a track axis perpendicular to a lengthwise centerline axis of the vehicle. In this way, the track may span a portion of the width of the vehicle. The camera may move along the track to avoid being obscured by the cargo of the vehicle.

The camera may be located inside of the vehicle and adjacent to a rearmost window, or the camera may be located outside of the vehicle and pointed in a direction behind the vehicle. In some embodiments, there may be multiple cameras located along a track and configured to detect image data of the environment behind the vehicle from multiple viewpoints and viewing angles.

The camera or cameras may also be capable of moving vertically along an extension (e.g., extension 430, 540). The extension may be used to elevate the camera or cameras to provide a view that is unobscured or less obscured by the cargo.

An ECU (e.g., ECU 602) determines, based on the image data from the camera, whether the view of the environment behind the vehicle is obscured by the cargo (step 704). In some embodiments, the ECU compares the image data over time and determines that a portion of the view is unchanging despite the vehicle moving, and therefore is obscured. In some embodiments, the ECU uses machine learning techniques to identify objects in the image data that are objects commonly held as cargo (e.g., large boxes, motorcycles, appliances) that may obscure the view to the environment behind the vehicle.

The ECU uses one or more actuators (e.g., actuator 608) to adjust a position of the camera until the view of the environment behind the vehicle is unobscured or less obscured (step 706). When the camera is a single camera, as shown in FIGS. 4A-4F, the one or more actuators may move the camera along the track and/or along the extension. The ECU may compare the image data detected at various camera positions to determine whether the view is obscured at any given camera position. In some embodiments, a percentage of the view obscured by the cargo may be determined for each camera position, and the camera position with the smallest percentage of view obstructed by the cargo may be the camera position used. When there are multiple camera positions where the view of the environment behind the vehicle is unobscured, the ECU may use a camera position that is closest to an initial, default camera position similar to the position shown in FIG. 4A where the camera is located along the lengthwise centerline axis of the vehicle.

When the camera is a plurality of cameras, as shown in FIGS. 5A-5B, the one or more actuators may adjust the height of the plurality of cameras along an extension (e.g., extension 540). In some embodiments, when the camera is a plurality of cameras that do not move along an extension or the view is not improved from moving vertically along an extension, the ECU may receive all of the image data from the plurality of cameras and determine a composite image of the view of the environment behind the vehicle. The ECU may then determine a portion of the composite image that is least obscured or unobscured. If there are more than one portion of the composite image that are unobscured, the ECU may use the portion of the composite image that is closest to the view from the lengthwise centerline axis.

A rear-view mirror (e.g., rear-view mirror 610) displays the unobscured or less obscured view of the environment behind the vehicle (step 708). The rear-view mirror is capable of operating in a first mode where the rear-view mirror reflects light similar to a conventional mirror and a second mode where the rear-view mirror displays an image using a display screen. In step 708, the rear-view mirror operates in the second mode to display the view using a display screen.

When the camera is moved from its initial, default position (e.g., moved horizontally and/or vertically), the perspective of the view from the new camera location may be different than the perspective of the view from the initial, default position. The driver may be accustomed to the view from the initial, default position, and a change in view perspective may be confusing for the driver. In some embodiments, the ECU performs image processing on the image data detected by the camera to adjust the perspective of the view to resemble a perspective from the initial, default position of the camera.

One or more sensors (e.g., sensors 618) may detect whether the cargo is removed, whether the cargo is moved within the vehicle, or whether additional cargo has been added (step 710). The sensors may be weight sensors configured to detect a distribution and magnitude of weight across a cargo area, such as a truck bed. In some situations, as a result of removing, adding, or moving cargo, the adjusted camera position of step 706 may now be obscured. In other situations, as a result of removing, adding, or moving cargo, an unobscured camera position that is closer to the initial, default camera position may be used.

When the sensors detect that the cargo has been removed, moved, or additional cargo has been added, the ECU may readjust the position of the camera to maintain an unobstructed or least-obstructed view of the environment behind the vehicle (step 712).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system or providing a view of an environment behind a vehicle, the system comprising:
 a camera located on a track and connected to the vehicle, the camera configured to detect image data of the environment behind the vehicle;
 an actuator configured to move a position of the camera laterally along the track or move the position of the camera vertically along a vertical extension;
 an electronic control unit (CU) connected to the camera and the actuator and configured to:
  determine, based on the image data, whether the view of the environment behind the vehicle is obscured, and
  adjust, using the actuator, the position of the camera along the track when the view of the environment behind the vehicle is obscured until the view of the environment behind the vehicle is unobscured or less obscured; and
 a rear-view mirror connected to the ECU and configured to display the view of the environment behind the vehicle.

2. The system of claim 1, wherein the track is located Aorta a track axis that is perpendicular to a lengthwise centerline axis of the vehicle.

3. The system of claim 1, wherein the camera is located inside of the vehicle and adjacent to a rearmost window of the vehicle.

4. The system of claim 1, wherein the camera is located outside of the vehicle.

5. The system of claim 1, wherein the ECU is further configured to:
 analyze, the image data at each camera position to determine a degree by which the view of the environment behind. the vehicle is obscured, and
 adjust the position of the camera until the degree by which the view of the environment behind the vehicle is obscured is minimized.

6. The system of claim 5, wherein the ECU uses machine learning techniques to identify an object located in the vehicle or attached to the vehicle to determine the degree by which the view of the environment behind the vehicle is obscured.

7. The system of claim 1, wherein the camera has an initial position located along a lengthwise centerline axis of the vehicle, and
 wherein the ECU is further configured to perform image processing on the image data when the camera is not in the initial position to transform the image data to adjust perspective and provide a simulated view of the environment behind the vehicle resembling a view from the camera in the initial position.

8. The system of claim 1, wherein the view of the environment behind the vehicle is obscured by cargo carried by the vehicle,
 wherein the system further comprises one or more sensors configured to detect whether the cargo is removed, whether the caro is moved within the vehicle, or whether additional cargo has been added, and
 wherein the ECU is connected to the one or more sensors, and responsive to a detection of the cargo being removed, the cargo being moved within the vehicle, or additional cargo being added, readjust, using the actuator, the position of the camera along the track such that the view of the environment behind the vehicle is unobscured or less obscured.

9. The system of claim 8, wherein the one or more sensors are one or more weight sensors located in a cargo storage area of the vehicle.

10. A system for providing a view of an environment tbehind a vehicle, the system comprising;
 a track located along an axis that is perpendicular to a lengthwise centerline axis of the vehicle;
 a plurality of cameras fixedly located on the track and connected to the vehicle, each camera of the plurality of cameras configured to detect image data of the environment behind the vehicle;
 an electronic control unit (ECU) connected to the plurality of cameras and configured to;
  determine a composite image of the view of the environment behind the vehicle based on the image data detected by the plurality of cameras,
  determine, based on the image data, whether a view of the environment behind the vehicle along the lengthwise centerline axis of the vehicle is obscured, and
  identify a portion of the composite image that is unobscured or least obscured; and
 a rear-view mirror connected to the ECU and configured to display the identified portion of the composite image. that is unobscured or least obscured.

11. The system of claim 10, wherein the plurality of cameras are located inside of the vehicle and adjacent to a rearmost window of the vehicle.

12. The system of claim 10, wherein the plurality of cameras are located outside of the vehicle.

13. The system of claim 10, further comprising:
 an extension configured to move a vertical position of the plurality of cameras, and
 one or more actuators configured to move the position of the plurality of cameras vertically along the extension.

14. The system of claim 10, wherein the ECU is further configured to perform image processing on the identified portion of the composite image that is unobscured or least obscured to adjust perspective and provide a simulated view of the environment behind the vehicle resembling a view of the environment behind the vehicle along the lengthwise centerline axis of the vehicle.

15. The system of claim 10, wherein the view of the environment behind the vehicle is obscured by cargo carried by the vehicle,
 wherein the system further comprises one or more sensors configured to detect whether the cargo is removed, whether the cargo is moved within the vehicle, or whether additional cargo has been added, and
 wherein the ECU is connected to the one or more sensors, and responsive to a detection of the cargo being removed, the cargo being moved within the vehicle, or additional cargo being added, reidentify the portion of the composite image that is unobscured or least obscured.

16. The system of claim 15, wherein the one or ore sensors are one or more weight sensors located in a cargo storage area of the vehicle.

17. A method for providing a view of an environment behind a vehicle, the method comprising:
 detecting, by a camera connected to the vehicle, image data of the environment behind the vehicle
 determining, by an electronic control unit (ECU), based on the image data, whether the view of the environment behind the vehicle is obscured by cargo carried by the vehicle;

automatically adjusting, using one or more actuators, a lateral position of the camera along a track or a vertical position of the camera along a vertical extension until the view of the environment behind the vehicle is unobscured or less obscured; and displaying, by a rear-view mirror display screen, the unobscured or less obscured view of the environment behind the vehicle.

18. The method of claim 17, further comprising;

analyzing, by the ECU, the image data at each camera position to determine a degree by which the view of the environment behind the vehicle is obscured; and adjusting, using the actuator, the position of the camera until the degree by which the view of the environment behind the vehicle is obscured is minimized.

19. The method of claim 17, further comprising:

detecting, by one or more sensors, whether the cargo is removed, whether the cargo is moved within the vehicle, or whether additional cargo has been added; and readjusting, using the actuator, the position of the camera such that the view of the environment behind the vehicle is unobscured or less obscured in response to the detection of the cargo being removed, the cargo being, moved within the vehicle, or additional cargo being added.

* * * * *